United States Patent
Masini

(10) Patent No.: US 10,392,745 B2
(45) Date of Patent: Aug. 27, 2019

(54) PROCESS FOR MANUFACTURING CARBON FIBER FABRICS AND FABRIC MANUFACTURED WITH THIS PROCESS

(71) Applicant: Automobili Lamborghini S.p.A., Sant'Agata Bolognese BO (IT)

(72) Inventor: Attilio Masini, Monteveglio (IT)

(73) Assignee: AUTOMOBILI LAMBORGHINI S.P.A., Sant'Agata Bolognese (BO) (IT)

( * ) Notice: Subject to any disclaimer, the term of this patent is extended or adjusted under 35 U.S.C. 154(b) by 205 days.

(21) Appl. No.: 15/333,437

(22) Filed: Oct. 25, 2016

(65) Prior Publication Data

US 2017/0037566 A1 Feb. 9, 2017

Related U.S. Application Data

(62) Division of application No. 14/371,233, filed as application No. PCT/IB2013/051113 on Feb. 11, 2013, now Pat. No. 9,511,564.

(51) Int. Cl.
*D06N 3/18* (2006.01)
*B32B 5/26* (2006.01)
(Continued)

(52) U.S. Cl.
CPC ........... *D06N 3/183* (2013.01); *B32B 3/04* (2013.01); *B32B 5/26* (2013.01); *B32B 27/12* (2013.01); *B32B 37/06* (2013.01); *B32B 37/10* (2013.01); *B32B 37/156* (2013.01); *B32B 37/24* (2013.01); *D06M 15/263* (2013.01); *D06M 15/564* (2013.01); *D06M 15/643* (2013.01); *D06M 17/00* (2013.01); *D06M 17/04* (2013.01); *D06M 17/08* (2013.01); *D06M 17/10* (2013.01); *B32B 2037/243* (2013.01); *B32B 2255/02* (2013.01); *B32B 2255/26* (2013.01); *B32B 2255/28* (2013.01); *B32B 2260/021* (2013.01);
(Continued)

(58) Field of Classification Search
None
See application file for complete search history.

(56) References Cited

U.S. PATENT DOCUMENTS 3,472,730 A * 10/1969 Frigstad ............... B29C 70/00
  156/182
3,816,211 A * 6/1974 Haigh ................. B44F 11/00
  156/219

(Continued)

FOREIGN PATENT DOCUMENTS

CN 101666137 A 3/2010
CN 101842027 A 9/2010
(Continued)

OTHER PUBLICATIONS

Machine translation of JP2011162897, Yoshimura et al. (Year: 2011).*

(Continued)

Primary Examiner — Shawn Mckinnon
(74) Attorney, Agent, or Firm — Lucas & Mercanti, LLP

(57) ABSTRACT

A fabric containing carbon fibers impregnated with a silicone, polyurethane or acrylic emulsion which is then dried together with the fabric is disclosed. A protective layer containing a film, a woven or non-woven fabric is applied onto one side of the fabric.

17 Claims, 1 Drawing Sheet

(51) Int. Cl.
   *B32B 27/12*    (2006.01)
   *D06M 15/643*   (2006.01)
   *B32B 37/00*    (2006.01)
   *B32B 37/24*    (2006.01)
   *D06M 15/263*   (2006.01)
   *D06M 15/564*   (2006.01)
   *B32B 3/04*     (2006.01)
   *B32B 37/10*    (2006.01)
   *D06M 17/00*    (2006.01)
   *D06M 17/04*    (2006.01)
   *D06M 17/08*    (2006.01)
   *D06M 17/10*    (2006.01)
   *B32B 37/06*    (2006.01)
   *D06M 101/40*   (2006.01)

(52) U.S. Cl.
   CPC ... *B32B 2260/046* (2013.01); *B32B 2262/106* (2013.01); *B32B 2305/22* (2013.01); *B32B 2307/546* (2013.01); *B32B 2309/022* (2013.01); *B32B 2313/04* (2013.01); *B32B 2333/04* (2013.01); *B32B 2375/00* (2013.01); *B32B 2398/20* (2013.01); *B32B 2605/003* (2013.01); *D06M 2101/40* (2013.01); *D06N 2211/261* (2013.01); *Y10T 156/1015* (2015.01); *Y10T 428/249921* (2015.04); *Y10T 442/30* (2015.04); *Y10T 442/60* (2015.04)

(56) References Cited

U.S. PATENT DOCUMENTS

| | | | |
|---|---|---|---|
| 4,604,319 A | 8/1986 | Evans et al. | |
| 4,957,839 A * | 9/1990 | Rokutanzono | G03G 5/0433 430/66 |
| 5,396,932 A * | 3/1995 | Homma | D03D 15/00 139/420 A |
| 6,368,712 B1 * | 4/2002 | Kobayashi | C08J 5/06 428/364 |
| 6,379,786 B1 * | 4/2002 | Takeshita | B32B 27/04 428/292.1 |
| 2003/0088025 A1 * | 5/2003 | Ogawa | C08G 8/28 525/107 |
| 2003/0175533 A1 * | 9/2003 | McGarry | B32B 5/26 428/447 |
| 2005/0127240 A1 | 6/2005 | Culp | |
| 2005/0262620 A1 * | 12/2005 | Li | B32B 5/26 2/455 |
| 2008/0004395 A1 * | 1/2008 | Covelli | C08G 18/0823 524/591 |
| 2012/0045623 A1 * | 2/2012 | Delaney | B32B 25/10 428/189 |

FOREIGN PATENT DOCUMENTS

| | | | |
|---|---|---|---|
| EP | 0415254 A2 | | 3/1991 |
| JP | 2003-278083 A | | 10/2003 |
| JP | 2004-149980 A | | 5/2004 |
| JP | 2006160787 | * | 6/2006 |
| JP | 2007169867 A | | 7/2007 |
| JP | 2011-162897 A | | 8/2011 |
| JP | 2011162897 | * | 8/2011 |
| WO | 2009036139 A1 | | 3/2009 |

OTHER PUBLICATIONS

Machine translation of JP2006160787, Ida et al. (Year: 2006).*
Chinese Office Action for corresponding Chinese Patent Application No. 201380007216.4 dated Feb. 15, 2016. (11 pages).
Database WPI, Week 200760, Thomson Scientific, London, GB; AN 2007-630579, XP002684432.
Database WPI, Week 200421, Thomson Scientific, London, GB; AN 2004-217331, XP002684433.
Database WPI, Week 201158, Thomson Scientific, London, GB; AN 2011-L13914, XP002684434.
Database WPI, Week 200442, Thomson Scientific, London, GB; AN 2004-444586, XP002699345.
International Search Report and Written Opinion for International Application No. PCT/IB2013/051113 (dated Jul. 11, 2013) 10 Pages).
Chinese Office Action for Chinese Application No. 2013800072164 dated Sep. 27, 2016. (18 Pages).

* cited by examiner

PROCESS FOR MANUFACTURING CARBON FIBER FABRICS AND FABRIC MANUFACTURED WITH THIS PROCESS

CROSS REFERENCE TO RELATED APPLICATIONS

This application is a divisional of U.S. application Ser. No. 14/371,233 filed on Jul. 9, 2014, which in turn is a 371 of PCT/IB2013/051113, filed Feb. 11, 2013, which claims the benefit of Italian Patent Application No. MI2012A000245, filed Feb. 20, 2012, the contents of each of which are incorporated herein by reference.

FIELD OF THE INVENTION

The present invention relates to a process for manufacturing carbon fiber fabrics, in particular a flexible fabric that can be used to coat inner parts of motor vehicles. The present invention also relates to a coating for motor vehicles comprising this fabric.

BACKGROUND OF THE INVENTION

Known carbon fiber fabrics comprise a web of thin filaments of carbon fibers arranged perpendicularly to each other. These known fabrics are impregnated with polymeric resins and overlapped according to suitable directions. The resins are cured to obtain rigid materials with a high specific resistance, which are suitable for the production of structural parts or aesthetic parts. These materials, because of their stiffness characteristic, cannot be applied for example to the internal parts of motor vehicles, where flexible fabrics that can be sewn and folded are required. This also excludes the use of raw fabrics made of carbon fiber, which tend to unthread and are not able to keep unchanged the arrangement of the fibers once deformed.

SUMMARY OF THE INVENTION

The object of the present invention is therefore to provide a fabric made of carbon fiber free from said drawbacks. Said object is achieved with a process, a fabric and a coating, whose main features are specified in the claims.

Thanks to its particular features, the fabric according to the present invention can be advantageously used for products and accessories of clothing or leather goods, in particular bags, as well as for other applications requiring a flexible fabric, such as for example coatings of seating and interior walls, in particular of motor vehicles. In fact, the fabric according to the present invention does not fray even when the fibers are stressed by the seams. Furthermore, even if deformed along two transversal axes of curvature, namely with concave or convex deformations, the fabric maintains a substantially perpendicular arrangement and a limited longitudinal sliding of the fibers, so as to avoid permanent deformations of its structure.

A particular protective layer is preferably applied to the fabric to improve the handling during the manufacture and/or to limit the flexibility of the fabric, as well as to make it resistant, waterproof, insulating, semi-transparent, non-transparent and/or opaque.

The fabric according to the present invention is pleasant to the touch and has a high resistance, superior to that of a raw fabric of carbon fiber, while retaining an extreme flexibility which allows also to create folds or hems on the same fabric without compromising the integrity. The fabric is also very elastic since its particular impregnation ensures a correct arrangement of the texture even after deformations. It is therefore possible to deform this fabric without compromising its texture and without causing unthreadings between the fibers.

According to an aspect of the invention, the particular silicone, polyurethane or acrylic emulsion also impregnates the most inner fibers of the fabric of carbon fiber, so as to obtain a fabric resistant to surface wear, but still extremely flexible.

At least one edge of the fabric in its final configuration is preferably folded and sewn on itself, so as to form a hem that prevents unthreading of the fibers of the most inner layers of the fabric.

BRIEF DESCRIPTION OF THE DRAWINGS

Further advantages and characteristics of the fabric and of the process according to the present invention will become apparent to those skilled in the art from the following detailed and non-limiting description of an embodiment thereof with reference to the accompanying drawings in which.

DETAILED DESCRIPTION OF THE INVENTION

Figure 1:
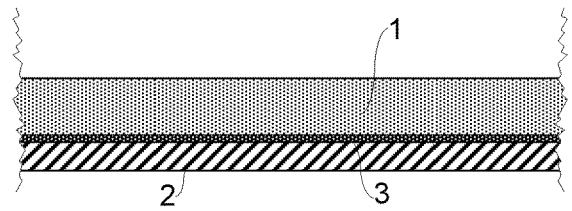
FIG. 1 shows a partial section of the fabric during a step of the process.

Referring to FIG. 1, it is seen that fabric 1 according to the present invention comprises at least a weave, in particular cloth, twill or satin weave, of yarns of carbon fiber having a linear density between 50 and 5000 g/km and comprising from 1000 to 60000 filaments, in particular from 3000 to 24000 filaments having a diameter comprised between 5 and 10 microns. The thickness of fabric 1 is comprised between 50 and 1000 microns. The basis weight of fabric 1 is comprised between 170 and 270 g/m$^2$, in particular 210 and 220 g/m$^2$.

In a first preliminary operating step, to ensure the regularity and a good aesthetic finish of the weave, fabric 1 is brushed and/or stretched at a temperature comprised between 30° and 200° and/or at a pressure comprised between 1 and 100 bar by means of two cylinders or two plates suitable to exert a variable pressure.

In a second preliminary operating step, at least one protective layer 2, in particular comprising a film, a woven fabric or a nonwoven fabric, more particularly a polyurethane, polyamide or acrylic film, is applied onto one side of fabric 1. The thickness of the protective layer 2 is comprised between 50 and 500 microns. The basis weight of the protective layer 2 is comprised between 20 and 40 g/m$^2$, in particular 25 and 35 g/m$^2$. The protective layer 2 is applied to fabric 1 by means of a lamination, in particular a hot calendering or pressing, in which fabric 1 and the protective layer 2 are laminated together at a temperature comprised between 30° and 200° and/or at a pressure comprised between 10 and 200 bar. During this operating step the surface of the protective layer 2 in contact with fabric 1 partially penetrates fabric 1, so as to create an intermediate layer 3, having a thickness comprised between 5% and 60% of the thickness of fabric 1, in which the outer filaments of fabric 1 are integral with the protective layer 2.

Figure 2:
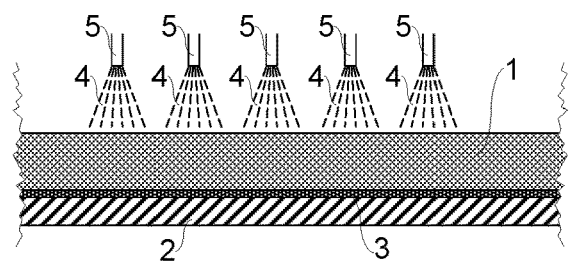
FIG. 2 shows the fabric of FIG. 1 during a subsequent step of the process.

Referring to FIG. 2, it is seen that in a main operating step fabric 1 is impregnated with a silicone, polyurethane or acrylic emulsion 4 by means of sprayers 5, or by smearing, immersion or with a "hot-melt" transfer procedure. Sprayers 5 are arranged on the opposite side of fabric 1 with respect to the protective layer 2, namely fabric 1 is comprised between the protective layer 2 and sprayers 5. Fabric 1 with the silicone, polyurethane or acrylic emulsion 4 is pressed through laminating rollers at a pressure exerted by the rollers comprised between 1 and 100 bar to penetrate the silicone, polyurethane or acrylic emulsion 4 into fabric 1 and remove the exceeding quantity.

In a subsequent step of the process the silicone, polyurethane or acrylic emulsion 4 in fabric 1 is dried, in particular through a heat treatment in an oven at a temperature comprised between 20° and 200° C., for a time comprised between 2 and 40 hours. At the end of this drying step fabric 1 is impregnated with a percentage of silicone, polyurethane or acrylic emulsion 4 comprised between 1% and 60% of the weight of fabric 1.

Figure 3:
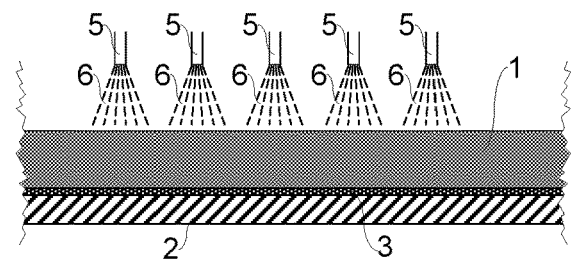
FIG. 3 shows the fabric of FIG. 1 during a subsequent step of the process.

Referring to FIG. 3, it is seen that in a subsequent optional step of the process, an aliphatic solution 6 is sprayed by means of the same sprayers 5 or of other sprayers onto fabric 1, so as to apply a basis weight of the aliphatic solution 6 comprised between 48 and 90 g/m$^2$, in particular 55 g/m$^2$±10% or 80 g/m$^2$±10%, after which the aliphatic solution 6 is dried.

The aliphatic solution 6 comprises polyacrylates, glycols and/or aliphatic polyurethane compounds, in particular opacifiers. The aliphatic solution 6 can also comprise silicon-oxygen chains.

Figure 4:
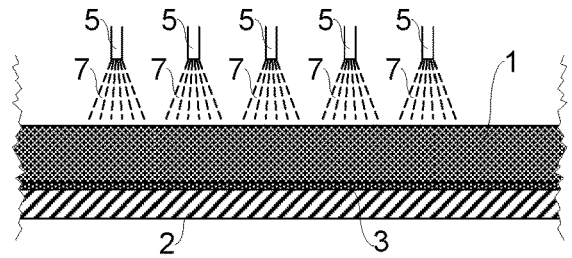
FIG. 4 shows the fabric of FIG. 1 during a further step of the process.

Referring to FIG. 4, it is seen that in a further optional step of the process, an aqueous emulsion 7 of isocyanate and/or crosslinking polyurea substances is sprayed by means of the same spraying 5 or of other sprayers onto fabric 1, after which this aqueous emulsion 7 is dried.

The basis weight of the fabric 1 at the end of the process is preferably comprised between 260 and 320 g/m$^2$.

In an alternative embodiment, the silicone, polyurethane or acrylic emulsion 4 can be applied to fabric 1 in the described above manner before applying the protective layer 2.

In a final operating step, at least one edge of fabric 1 impregnated with the silicone, polyurethane or acrylic emulsion 4 and joined to the protective layer 2, if any, is folded and sewn on itself so as to form a hem.

Possible variants and/or additions may be made by those skilled in the art to the embodiment of the invention here described and illustrated remaining within the scope of the following claims. In particular, further embodiments of the invention may include the technical features of one of the following claims, with the addition of one or more technical features, taken individually or in any mutual combination, described in the text and/or illustrated in the drawings.

The invention claimed is:

1. A cured, carbon fiber fabric comprising:
   carbon fibers impregnated with a first coating of silicone, polyurethane or acrylic emulsion which is then dried together with the fabric, and impregnated with a second coating of an aliphatic solution comprising polyacrylates or glycols and thereafter dried,
   wherein at least one protective layer comprising a film, a woven fabric or a nonwoven fabric is applied onto one side of the fabric,
   wherein the cured, carbon fiber fabric is foldable, and
   wherein the surface of the protective layer contacting the fabric partially penetrates the fabric, so as to create an intermediate layer in which the outer filaments of the fabric are integral with the protective layer.

2. The fabric according to claim 1, wherein the fabric is impregnated with a percentage of silicone, polyurethane or acrylic emulsion between 1% and 60% of the weight of the fabric.

3. The fabric according to claim 1, wherein the protective layer is laminated to the side of the fabric.

4. The fabric according to the claim 1, wherein the protective layer comprises a polyurethane, polyamide or acrylic film.

5. The fabric according to claim 1, wherein the thickness of the intermediate layer is between 5% and 60% of the thickness of the fabric.

6. The fabric according to claim 1, wherein the basis weight of the aliphatic solution is between 48 and 90 g/m$^2$.

7. The fabric according to claim 1, wherein the carbon fibers are impregnated with a third coating of an aqueous emulsion of isocyanate or crosslinking polyurea substances, after which the fabric is dried.

8. The fabric according to claim 1, wherein the thickness of the fabric in its initial non-impregnated state is between 50 and 1000 microns.

9. The fabric according to claim 1, wherein the basis weight of the fabric in its initial non-impregnated state is between 170 and 270 g/m$^2$.

10. The fabric according to claim 1, wherein the basis weight of the fabric in its final state is between 260 and 320 g/m$^2$.

11. The fabric according to claim 1, wherein at least one edge of the fabric is folded and sewn on itself so as to form a hem.

12. The fabric according to claim 1, wherein the fabric in its final state is deformable along two transversal curvature axes.

13. The fabric according to claim 1, comprising at least one weave of yarns of carbon fiber having a linear density between 50 and 5000 g/km and comprising from 1000 to 60000 filaments having a diameter between 5 and 10 microns.

14. The fabric according to claim 1, wherein the thickness of the protective layer is c between 50 and 500 microns.

15. The fabric according to claim 1, wherein the basis weight of the protective layer is between 20 and 40 g/m$^2$.

16. A lining for motor vehicles, comprising a fabric according to claim 1.

17. A product or accessory of clothing or leather goods, comprising a fabric according to claim 1.

* * * * *

UNITED STATES PATENT AND TRADEMARK OFFICE
CERTIFICATE OF CORRECTION

PATENT NO. : 10,392,745 B2
APPLICATION NO. : 15/333437
DATED : August 27, 2019
INVENTOR(S) : Masini Page 1 of 1

It is certified that error appears in the above-identified patent and that said Letters Patent is hereby corrected as shown below:

On the Title Page

Please add item (30) "Foreign Application Priority Data" and add "Feb. 20, 2012 (IT) MI2012A000245"

Signed and Sealed this
Twenty-fourth Day of September, 2019

Andrei Iancu
*Director of the United States Patent and Trademark Office*